(12) United States Patent
Herbold et al.

(10) Patent No.: US 8,914,967 B2
(45) Date of Patent: Dec. 23, 2014

(54) METHOD FOR PRODUCING A DISTRIBUTED LAP WINDING FOR POLYPHASE SYSTEMS

(75) Inventors: Klaus Herbold, Asperg (DE); Gerlinde Weber, Schwieberdingen (DE); Christoph Schwarzkopf, Walheim (DE); Helmut Kreuzer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/139,901

(22) PCT Filed: Dec. 21, 2009

(86) PCT No.: PCT/EP2009/067696
§ 371 (c)(1),
(2), (4) Date: Aug. 31, 2011

(87) PCT Pub. No.: WO2010/070148
PCT Pub. Date: Jun. 24, 2010

(65) Prior Publication Data
US 2011/0302767 A1  Dec. 15, 2011

(30) Foreign Application Priority Data

Dec. 19, 2008  (DE) .......................... 10 2008 054 999

(51) Int. Cl.
*H02K 15/00* (2006.01)
*H02K 15/06* (2006.01)
*H02K 15/04* (2006.01)

(52) U.S. Cl.
CPC .......... *H02K 15/066* (2013.01); *H02K 15/0464* (2013.01)

USPC .................. 29/596; 29/598; 29/605; 29/606; 310/43

(58) Field of Classification Search
CPC ... H02K 1/148; H02K 1/2766; H02K 15/026; H02K 15/03; H02K 15/022; H02K 2201/09
USPC .................. 29/596–598, 732–736, 605–609; 242/433; 310/43, 266–268
See application file for complete search history.

(56) References Cited

U.S. PATENT DOCUMENTS 5,197,180 A * 3/1993 Mihalko .......................... 29/596
6,019,141 A * 2/2000 Barrera ......................... 140/92.2
(Continued)

FOREIGN PATENT DOCUMENTS

GB          2202170          9/1988

OTHER PUBLICATIONS

PCT/EP2009/067696 International Search Report.

*Primary Examiner* — Minh Trinh
(74) *Attorney, Agent, or Firm* — Michael Best & Friedrich LLP

(57) ABSTRACT

Method for producing a distributed lap winding for polyphase systems, in particular for alternators, wherein, in a first step, a chain of laps is formed with a linking direction, characterized in that, in a further step, at least one lap is rotated with its lap sides at right angles to the linking direction such that at least one lap side of one lap is arranged alongside at least one lap side of another lap such that the at least one lap side of one lap and the at least one lap side of another lap are arranged at a position which corresponds to a slot position.

9 Claims, 5 Drawing Sheets

(56) References Cited

U.S. PATENT DOCUMENTS

| | | |
|---|---|---|
| 6,750,582 B1 * | 6/2004 | Neet .............................. 310/208 |
| 7,132,775 B2 | 11/2006 | Oohashi et al. |
| 7,143,506 B2 * | 12/2006 | Ooiwa ............................ 29/606 |
| 7,302,749 B2 * | 12/2007 | Kreuzer et al. ................. 29/596 |
| 7,600,311 B2 | 10/2009 | Kreuzer et al. |
| 7,952,250 B2 | 5/2011 | Hasegawa et al. |
| 2003/0071534 A1 * | 4/2003 | Kreuzer et al. ................ 310/216 |
| 2004/0261255 A1 * | 12/2004 | Stroebel et al. ................. 29/606 |
| 2005/0062359 A1 * | 3/2005 | Neet et al. ..................... 310/214 |
| 2009/0160286 A1 | 6/2009 | Wolf et al. |

\* cited by examiner

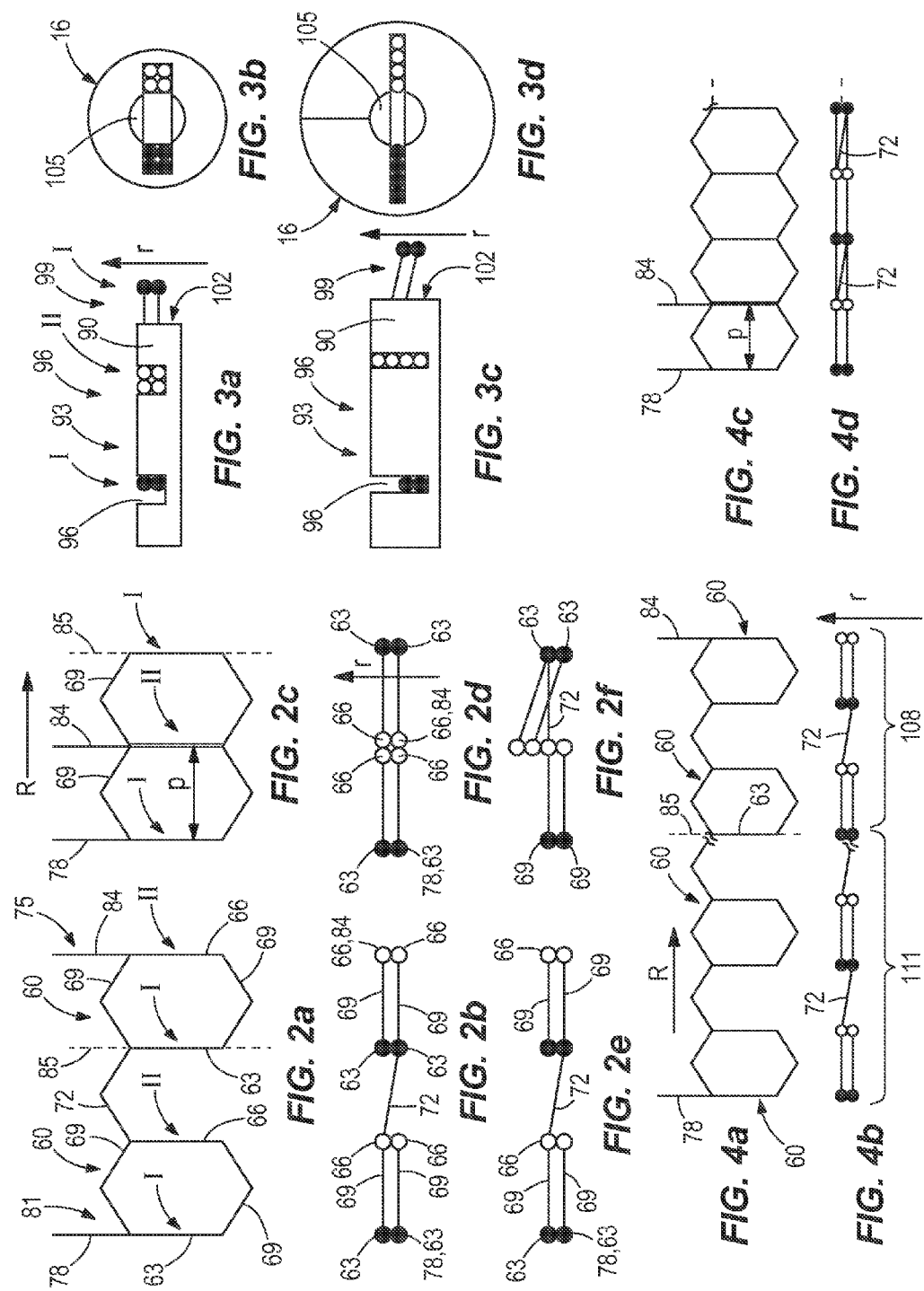

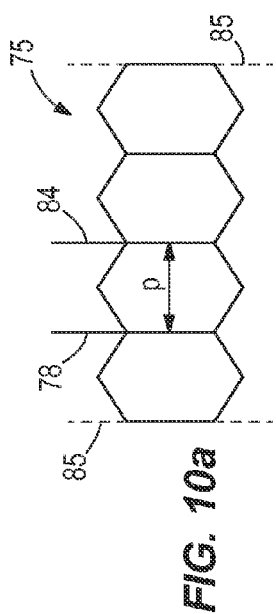
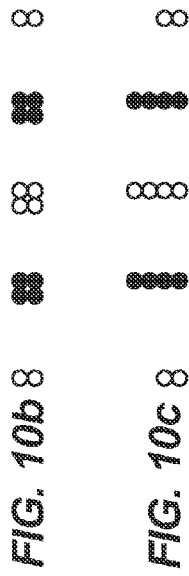
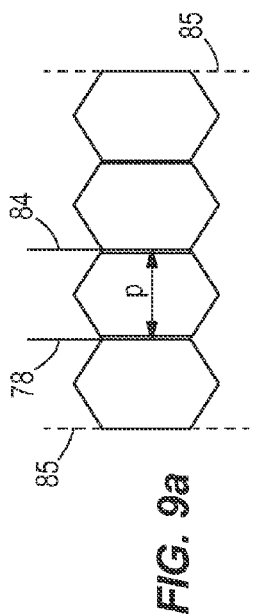
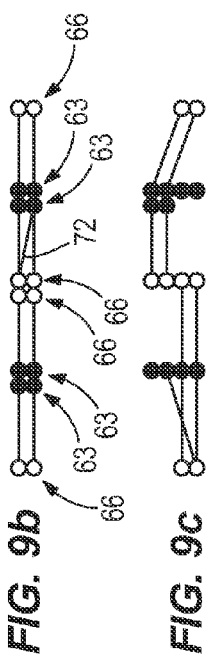
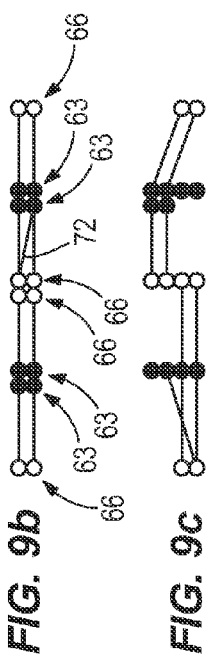
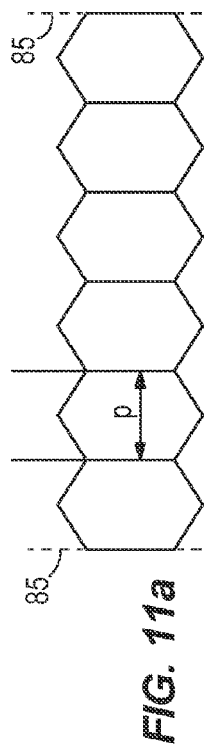
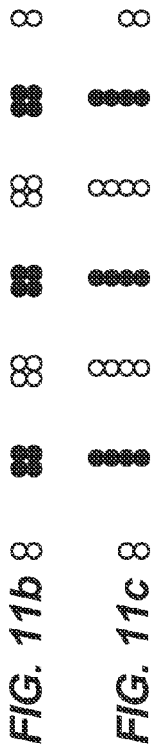
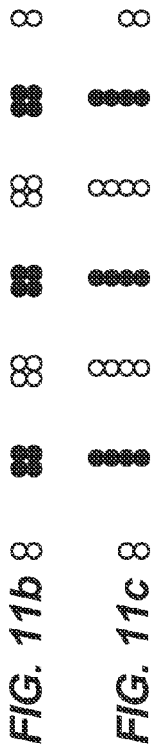

METHOD FOR PRODUCING A DISTRIBUTED LAP WINDING FOR POLYPHASE SYSTEMS

BACKGROUND OF THE INVENTION

The international publication WO 01/54254 A1 has disclosed a stator core for an electrical machine, said stator core being produced using so-called flatpack technology. In this method, individual strip-shaped laminations are stacked one on top of the other congruently. An approximately cuboid, substantially flat stator core is thus formed, which has the electromagnetically effective slots and teeth on one side in the form of a comb, said slots and teeth being provided for the interaction with a rotor. A separately prepared flat winding is inserted into this comb-like stator core. This flatpack winding can be in the form of a single or distributed lap or wave winding.

The assembly comprising the stator core with the winding is then rounded in an apparatus to form a stator in the form of a circular ring. In this case, winding overhangs which may be present and which are initially not arranged in slots when the winding is inserted into the stator core are inserted into the corresponding slot. Those end sides of the stator core which are opposite one another after the rounding operation are joined, for example by means of a welding operation. The described procedure is generally used for three-phase generators and is used in a present generator generation.

The European patent application EP 1 494 337 A2 has disclosed a method for producing a two-layered lap windings for polyphase electrical machines from a wire bundle, the wire bundle being wound onto a winding bar by virtue of, in a first step, a first loop of a first phase winding being wound and then a loop connector of the first phase winding being laid in a first direction and, in a further step, a loop of a further phase winding being wound over the loop connector.

SUMMARY OF THE INVENTION

The object of the invention is to describe a method for producing a continuously wound distributed lap winding for polyphase systems. The distributed lap winding is wound continuously and is used in particular for a flatpack stator (see international publication WO 01/54254 A1).

BRIEF DESCRIPTION OF THE DRAWINGS

The invention will be explained with reference to the figures.

In the figures:

FIGS. 2a and 2b show a winding diagram of a distributed lap winding prior to and after a folding operation, FIGS. 2b and 2d show schematic side views of the lap winding shown in FIGS. 2a and 2b with loop sides positioned next to one another, FIGS. 2e and 2f show schematic side views of the lap winding shown in FIGS. 2a and 2b in a variant with loop sides positioned one above the other, FIGS. 3a and 3b show the winding shown in FIG. 2d in a stator core which is still flat and in the rounded state, FIGS. 3c and 3d show the winding shown in FIG. 2f in a stator core which is still flat and in the rounded state, FIGS. 4a and 4b show a further exemplary embodiment of a winding in plan view and in a side view prior to the folding, FIGS. 4c and 4d show the winding shown in FIGS. 4a and 4b after the folding, FIGS. 9a to 9c show a plan view and two side views of a lap winding with four loops (FIG. 6). The two side views show two different arrangements of the loop sides, FIG. 10 shows a plan view and two side views of a lap winding with four loops (FIG. 7). The two side views show two different arrangements of the loop sides, FIG. 11 shows a plan view and two side views of a lap winding with four loops (FIG. 8). The two side views show two different arrangements of the loop sides.

DETAILED DESCRIPTION

Figure 1:
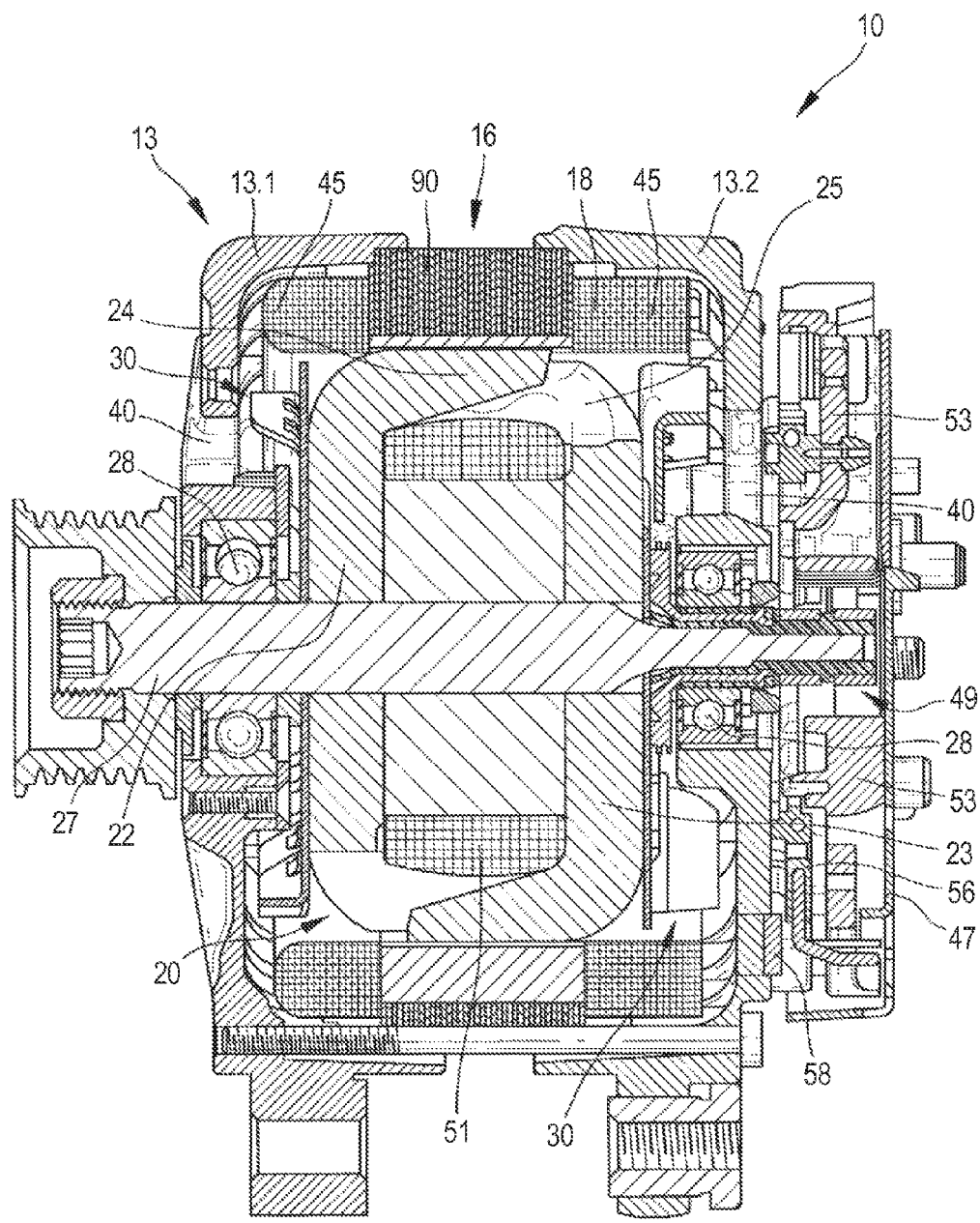
FIG. 1 shows a longitudinal section through an electrical machine.

FIG. 1 illustrates a cross section through an electrical machine 10, in this case in the embodiment as a generator or AC, in particular three-phase, generator for motor vehicles. This electrical machine 10 has, inter alia, a two-part housing 13, which comprises a first end plate 13.1 and a second end plate 13.2. The end plate 13.1 and the end plate 13.2 accommodate a so-called stator 16 between them, which firstly comprises a stator core 17 which is substantially in the form of a circular ring and has a stator winding 18 inserted into the axially extending slots of said stator core which point radially inwards. This annular stator 16 surrounds, with its slotted surface which points radially inwards, a rotor 20, which is in the form of a claw-pole rotor. The rotor 20 comprises, inter alia, two claw-pole boards 22 and 23, with in each case claw-pole fingers 24 and 25 extending in the axial direction being arranged on the outer circumference of said claw-pole boards. The two claw-pole boards 22 and 23 are arranged in the rotor 20 in such a way that their claw-pole fingers 24 and 25, respectively, extending in the axial direction alternate with one another at the circumference of the rotor 20. This produces magnetically required interspaces between the oppositely magnetized claw-pole fingers 24 and 25, said interspaces also being referred to as claw-pole interspaces. The rotor 20 is mounted rotatably in the respective end plates 13.1 and 13.2 by means of a shaft 27 and in each case one roller bearing 28 located on in each case one rotor side.

In total, the rotor 20 has two axial end faces, on which in each case one fan 30 is fixed. This fan 30 substantially comprises a plate-shaped or disk-shaped section, from which fan blades emerge in a known manner. These fans 30 serve the purpose of enabling air exchange between the outside of the electrical machine 10 and the interior of the electrical machine 10 via openings 40 in the end plates 13.1 and 13.2. For this purpose, the openings 40 are provided substantially at the axial ends of the end plates 13.1 and 13.2, via which cooling air is sucked into the interior of the electrical machine 10 by means of the fans 30. This cooling air is accelerated radially outwards by the rotation of the fans 30, with the result that it can pass through the winding overhang 45, which is permeable to cooling air. As a result of this effect, the winding overhang 45 is cooled. Once it has passed through the winding overhang 45 or once it has flowed around this winding overhang 45, the cooling air takes a path radially outwards, through openings (not illustrated here in this FIG. 1).

On the right-hand side in FIG. 1 there is a protective cap 47, which protects various component parts from environmental influences. Thus, this protective cap 47 covers a so-called slipring assembly 49, for example, said slipring assembly serving the purpose of supplying field current to a field winding 51. A heat sink 53, which in this case acts as positive heat sink, is arranged around this slipring assembly 49. The end plate 13.2 acts as so-called negative heat sink. A connection terminal plate 56 is arranged between the end plate 13.2 and the heat sink 53, said connection terminal plate serving the purpose of connecting negative diodes 58 arranged in the end plate 13.2 and positive diodes (not shown here in this illustration) in the heat sink 53 to one another and therefore representing a bridge circuit known per se.

FIG. 2a illustrates two typical loops 60. The loops 60 have loop sides 63 and 66, which are each connected by loop side connectors 69. Two mutually adjacent loops 60 are connected by arcuate loop connectors 72. This typical winding 75 here will be explained in more detail by way of example.

Starting from a winding-phase start 78 (the lower loop side 63 in FIG. 2b), a first loop side 63 is laid with a wire 81, said first loop side then becoming a loop side connector 69 and from there running on integrally to become a second loop side 66. After this second loop side 66, the wire 81 becomes a second loop side connector 69. This is adjoined as the next section by a loop side 63, which is on the first loop side 63 or is arranged over this (FIG. 2b). The winding 75 continues with a loop side connector 69, which is arranged over the first loop side connector 69. A fourth loop side 66 adjoins integrally, is arranged over the second loop side 66 and becomes the loop connector 72. This is adjoined by the second loop 60 directly with a loop side 63. The second loop 60 has an identical design and ends with a winding-phase end 84, an extended loop side 66. FIG. 2b illustrates a schematic side view of the winding 75.

Then, the loop sides 66 of the second loop 60 are rotated perpendicular to the linking direction R or folded about a folding axis 85 in such a way that at least one loop side 66 of one first loop 60 is arranged next to at least one loop side 66 of another loop 60 in such a way that the loop sides 66 are adjacent to one another directly or next to one another, with the result that the loop sides 66 and 63 are arranged in such a way that they later fit into a slot in a stator core. For this purpose, no special arrangement needs to be achieved. Some or all of the loop sides which are later intended to be inserted into a slot can also be adjacent directly next to one another, however.

A folding axis 85 is at a position of one loop side in all of the examples described here.

In FIGS. 2a and 2b, the loops 60 are configured with two turns. More turns are of course also possible, for example three, four, five, six or more.

As shown in FIGS. 2c and 2d, the four coil sides 66 are laid in the form of a square, with the result that two coil sides 66 are positioned next to one another in direction R and therefore in two rows (a plurality of rows; three or more rows are also possible) and in turn at least two coil sides 66 are positioned next to one another in direction r. The direction r corresponds to a direction which is oriented firstly perpendicular to the linking direction R but also perpendicular to a loop side 63 or 66 (direction of the wire profile mid-axis).

As shown in FIGS. 2e and 2f, the four coil sides 66 are laid in a single-row arrangement (with respect to the stator core in the radial direction), with the result that only in each case one coil side 66 is arranged in direction R, but in turn at least two coil sides 66, namely the two central coil sides 66, are positioned next to one another in direction r. The direction r corresponds to a direction which is oriented firstly perpendicular to the linking direction R but also perpendicular to a loop side 63 or 66 (direction of the wire profile mid-axis).

FIG. 2c therefore shows a winding 75 which is a distributed lap winding. The feature of the distribution is that, starting from a later slot position (the location at which the loop sides 66 are found), the coil side connectors 69 are distributed both in direction R and in the opposite direction.

If this method is applied to a plurality of windings 75, which make up in each case one winding phase of a stator 16, for example, this provides a method for producing a distributed lap winding for polyphase systems, in particular for AC generators, wherein, in a first step, a chain of loops 60 with a linking direction R is formed, characterized by the fact that, in a further step, at least one loop 60 with its loop sides 63, 66 is rotated perpendicular to the linking direction R in such a way that at least one loop side 66 of one loop 60 is arranged next to at least one loop side 66 of another loop 60 in such a way that the loop sides 66 are adjacent directly next to one another.

The loop connectors 72 are all arranged on the same side of the flat pack or stator core.

FIGS. 3a and 3c show a schematic of in each case one flat stator core 90. Each stator core 90 has a laminated structure, as is conventional, and has slots 96, which are open on a side 93 of the stator core 90 and into which in each case one winding 75 is inserted. In FIG. 3a, the winding 75 is used as illustrated in FIG. 2c with the arrangement shown in FIG. 2d, and in FIG. 3c, the winding 75 is used as illustrated in FIG. 2e with FIG. 2f. In both cases, the loop sides 63 of the second loop 60 form a so-called winding overhang 99, which is initially arranged outside the stator core 90. In both cases, the winding overhang 99 can be moved in direction r, with the result that the winding overhang 99 is not arranged or positioned directly opposite an end face 102 of the stator core 90. Then, the respective stator core 90 is rounded and is inserted into the slot 96, which has not been completely filled (in each case on the left-hand side in FIGS. 3a and 3c), either shortly before the end of the rounding process or after the rounding process. Finally, a stator 16 as is illustrated in a respective simplest variant in FIGS. 3b and 3d, is produced. The stator 16 has in each case one central opening 105, which is suitable for accommodating a rotor 20.

FIG. 4a illustrates a winding 75, which has the same basic design as the winding 75 illustrated in FIG. 2a. The difference consists in the number of coils 60, which is also an even number here but is markedly higher. The number can be 12 or 16, for example, with the result that a 12-pole or 16-pole winding 75 is produced.

It is clear from the previously described method sequences that the winding 75 is laid after the winding of the chain with a part 108 of the winding 75 onto the other part 111 of the winding 75 (V variant). While this operation is being performed, a "V" shape or angled shape of the chain of loops 60 is produced in a side view (see also FIG. 5).

Accordingly, a part 108 of the winding 75 is rotated relative to another part 111 of the winding 75, with the result that the part 108 and the part 111 of the winding 75 enclose an angle α between them during the rotation.

The invention therefore discloses a method by virtue of which loop connectors 72 have a multilayered configuration between two loops 60 (see also FIG. 4b, FIG. 4d).

The sum of the loops 60 in the parts 108 and 111 should be equal.

The winding-phase start 78 and the winding-phase end 84 are, moreover, a pole width P or loop width apart after the rotation or folding in all of the exemplary embodiments (see also FIGS. 2a, 4c, 9, 10 and 11).

Double Folding

Figure 7:
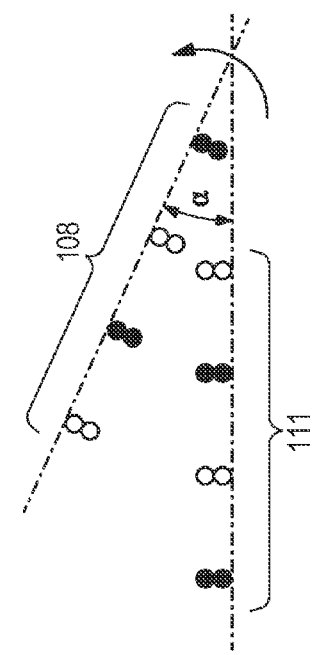
FIG. 7 shows a third schematic side view of a lap winding with four loops during a folding operation in accordance with a first variant.
Figure 6:
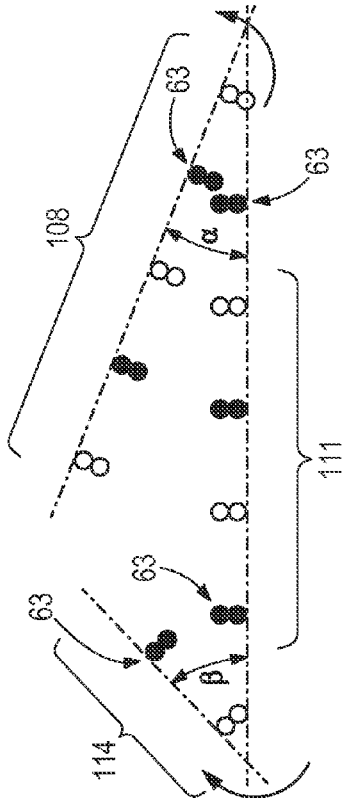
FIG. 6 shows a second schematic side view of a lap winding with four loops during a folding operation in accordance with a first variant.

Variants of this method arise by virtue of the fact that firstly the winding 75 has at least four loops 60 and secondly outer parts 108 and 114 of the winding 75 are rotated relative to a central part 111. Examples are given here in FIGS. 6, 7, 8, 9, 10 and 11. The design of the windings 75 illustrated in FIGS. 6 and 7 is as depicted and correspondingly described in FIGS. 4a and 4b. As shown in FIG. 6, in each case only the outermost loops 60 on the right-hand side and the left-hand side are rotated in each case about one of their loop sides 66 (loop 60 on the left-hand side) or about one of their loop sides 66 (loop 60 on the right-hand side) in order that a loop side (66) of one loop (60) of a part 108 and a loop side (63) of one loop (60) of a part 111 are arranged next to at least one loop side (66) of another loop (60) of a part 114, with the loop sides (63, 66) being adjacent directly next to one another.

Figure 8:
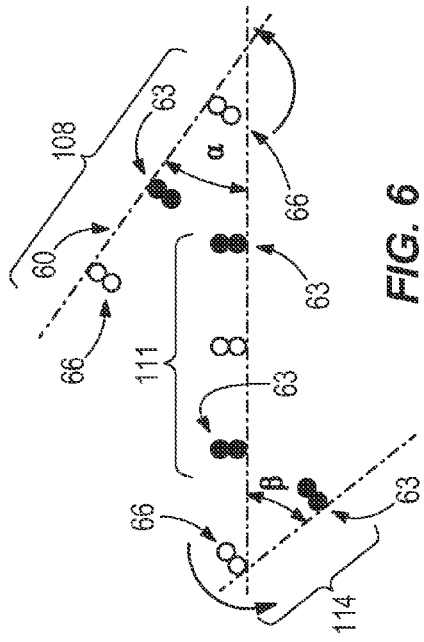
FIG. 8 shows a fourth schematic side view of a lap winding with four loops during a folding operation in accordance with a first variant.

Provision is accordingly made (FIGS. 6, 7, 8) for in each case two parts (108, 111; 111, 114) of the winding (75) to be rotated relative to one another in such a way that in each case two parts (108, 111; 111, 114) of the winding (75) enclose in each case an angle (α; β) between them during the rotation and at least three parts (108, 111, 114) are involved in this. FIG. 6 shows a so-called Z variant since, while this operation is being performed, a "Z" shape or double-angle shape of the chain comprising loops 60 is produced in a side view (see also FIG. 5). In this case, the angles α and β are on opposite sides of the part 111. FIGS. 7 and 8 each illustrate a so-called U variant since, while this operation is being performed, a "U" shape of the chain comprising loops 60 can be produced in a side view (α and β can at the same time be 90°, for example). In this case, the angles α and β are on the same side of the part 111. It is naturally also possible for the parts 114 and 108 to be folded onto the part 111 one after the other. The described method splits the winding 75 (the winding phase) into three parts 108, 111, 114 (winding-phase parts) with two reversal points (turning points at the angles α and β).

Starting from the illustration shown in FIG. 7, the parts 108 and 114 can also be rotated in the other direction in each case.

FIGS. 9a and 9b illustrate both a plan view of a winding 75 and a schematic side view of the same winding 75 after the winding 75 or parts 108 and 114 thereof have been rotated correspondingly as illustrated in FIG. 6. The rotated loop sides 63 and 66 are now positioned in a two-row arrangement with the other loop sides 63 and 66 remaining in position. Alternatively, the loop sides, as also already shown in FIG. 2f, can also be arranged in a single-row arrangement (FIG. 9c).

FIGS. 10a and 10b illustrate both a plan view of a winding 75 and a schematic side view of the same winding 75 once the winding 75 or parts 108 and 114 thereof have been rotated correspondingly as illustrated in FIG. 7. The rotated loop sides 63 and 66 are now positioned in a two-row arrangement with the other loop sides 63 and 66 remaining in position. Alternatively, the loop sides, as already also shown in FIG. 2f, can also be arranged in a single-row arrangement (FIG. 10c).

The windings 75 illustrated in FIGS. 6, 7, 8, 9, 10 and 11 are only by way of example, very particularly as regards the lengths, i.e. numbers of loops 60. Thus, FIG. 6 illustrates a winding 75 with two loops 60 in the parts 108 and 111 (including the loop which comprises the loop sides 66 at angle α) and in each case one loop 60 in the parts 108 and 114. The sum of the loops 60 in the parts 108 and 114 should be equal to the number of loops 60 in the part 111. The number there can be three, four, five, six, seven, eight etc., for example. The same applies to the examples shown in FIGS. 7, 8, 9, 10 and 11.

In general, an equal number or sum of loop side connectors 69 and loop connectors 72 results from the above-described examples in an end winding (end coil) of a winding 75 once the parts 108 and 111 and possibly also 114 have been laid one over the other between two loop sides 63 and 66 which are connected directly to one another and the associated respective slot position. If, as has already been described, the winding 75 shown in FIGS. 2a to 2d or FIGS. 2a, 2b, 2e and 2f is manufactured, the following states result for both cases:

A loop side 69 is produced between slot position I and II (between the winding-phase start 78 and the winding-phase end 84, FIG. 2c) on that side of the winding 75 on which the winding-phase start 78 and winding-phase end 84 are arranged (so-called "B" side since at least in general the "B"rushes of the electrical machine are arranged on this side). To the right of this between slot position II and I, two loop sides 69 and one loop connector 72 are produced. On that side of the winding 75 which is opposite the winding-phase start 78 and the winding-phase end 84 ("D" side since at least in general the "D"rive side of the electrical machine is arranged on this side: either the drive of the electrical machine as a generator or the drive of the electrical machine as a motor in order to drive other machines via a pulley, for example), two loop side connectors 69 are produced between slot position I and II and slot position II and I. In each case four loop sides 63 and 66 are located at slot position I and at slot position II, respectively. The number of conductors per slot is thus an even number.

Figure 5:
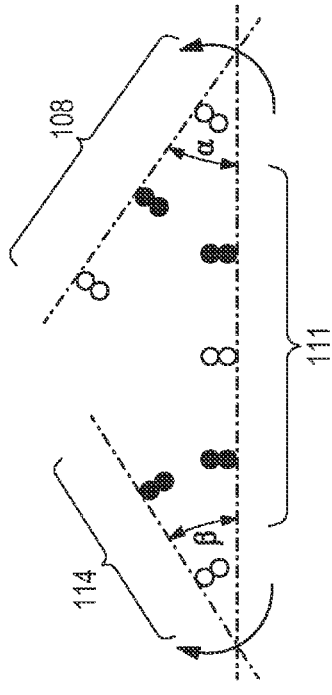
FIG. 5 shows a first schematic side view of a lap winding with four loops during a folding operation in accordance with a first variant.

If it were desirable to achieve an uneven number of conductors per slot and winding 75, the winding 75 would need to be prepared differently depending on the number of parts 108, 111, 114 of said winding:

Operation shown in FIGS. 2, 4 and 5 (single rotation of a part 108 with respect to a part 111 about a folding axis 85): either the number of loops 60 of the part 108 is an even number and the number of loops 60 of the part 111 is an uneven number or completely the other way around, with the number of loops 60 of the part 108 being an uneven number and the number of loops 60 of the part 111 being an even number. Alternatively, it is also possible for a loop 60 to be provided with an even number of turns and for a following loop 60 to be provided with an uneven number of turns alternately in constantly repeating fashion. In accordance with a development of FIG. 2, the second loop 60 would then have, for example, three turns with in each case three loop sides 63 and 66, with the result that there would be two loop sides 63, produced at slot position I prior to the insertion into the stator core 90 and rounding of the stator core 90, five loop sides 66 would be produced at slot position II and again two loop sides 63 would be produced in the winding overhang 99 at slot position I. The same applies to an embodiment as shown in FIGS. 4 and 5.

Operation as shown in FIGS. 6, 7 and 8 (double rotation within the winding 75 with a rotation of the part 108 with respect to a part 111 about a folding axis 85 and with a rotation of the part 114 about a folding axis 85 with respect to a part 111): either the number of loop 60 of the parts 108 and 114 is an even number and the number of loops 60 of the part 111 is an uneven number or completely the other way round, with the number of loops 60 of the parts 108 and 114 being an uneven number and the number of loops 60 of the part 111 being an even number.

The statements regarding the uneven number of conductors per slot and winding 75 are general with the proviso that the number of loops 60 should be equal per layer (FIG. 2: first layer represented by the left-hand loop 60, second layer by the right-hand loop 60. In analogy to this, in FIGS. 4a to 4d and FIG. 5, the part 111 represents the first layer and the part 108 represents the second layer).

For windings 75 which are only rotated once (FIG. 2, FIG. 4, FIG. 5), i.e. only a part 108 is laid onto a part 111, the following relationship applies when using a single wire 81 and presupposing that all of the loops 60 within one part 108, 111 have the same number of turns n108 and n111, respectively, in accordance with which relationship overall nslot=n108+n111, nslot corresponds to the number of single wires in a prescribed slot.

For the case in which n108=2 and n111=2, nslot=4. For the case in which n108=3 and n111=2, nslot=5. For the case in which n108=2 and n111=3, nslot=5. For the case in which n108=3 and n111=3, nslot=6. For the case in which n108=3 and n111=4, nslot=7. For the case in which n108=4 and n111=3, nslot=7. For the case in which n108=4 and n111=4, nslot=8.

The end windings of the distributed lap winding with an even number of conductors are arranged uniformly on the stator core. This virtually symmetrical design of the end windings produces an approximately constant flexural strength in the entire flat pack over the length of the stator core. This results in improved roundness in the ready-bent stator in the form of a cylindrical ring.

The distributed lap winding is virtually symmetrical along the flat pack. Identical end windings free of interference points which audibly influence a surrounding flow of air, for example, result on the D and B sides. The end windings for the distributed lap winding with an even number of conductors nslot are arranged uniformly over the longitudinal extent of the flat pack. The end windings for the distributed lap winding with an uneven number of conductors alternate from coil to coil.

In all of the described cases, a single-layered lap winding results. In addition, a so-called distributed end winding is produced per winding phase.

As can be seen from FIGS. 2d, 2f, 3a, 3c, 4c, 4d, 9a, 9b, 9c, 10a, 10b, 10c, 11a, 11b, 11c, a lap winding which is arranged in two layers and is suitable for a laminate stack described at the outset as a flat pack or as a flat stator core 90, owing to its flatness, results.

As results after the rotation or laying of the individual parts 108, possibly also the part 114, loop side connectors 69 of one part lie on loop connectors 72 of another part.

The winding 75 can be made to form a second layer at any desired loop. This second layer comprises half the loops 60 of the winding 75 (of the winding phase).

In the variants with an angle α, the winding-phase start 78 (winding start) and winding-phase end 84 (winding end) coincide at the same loop 60 (coil) (see FIGS. 2c, 2f, 4c, 5, 6, 7, 8, 9, 10 and 11).

Figure 12:
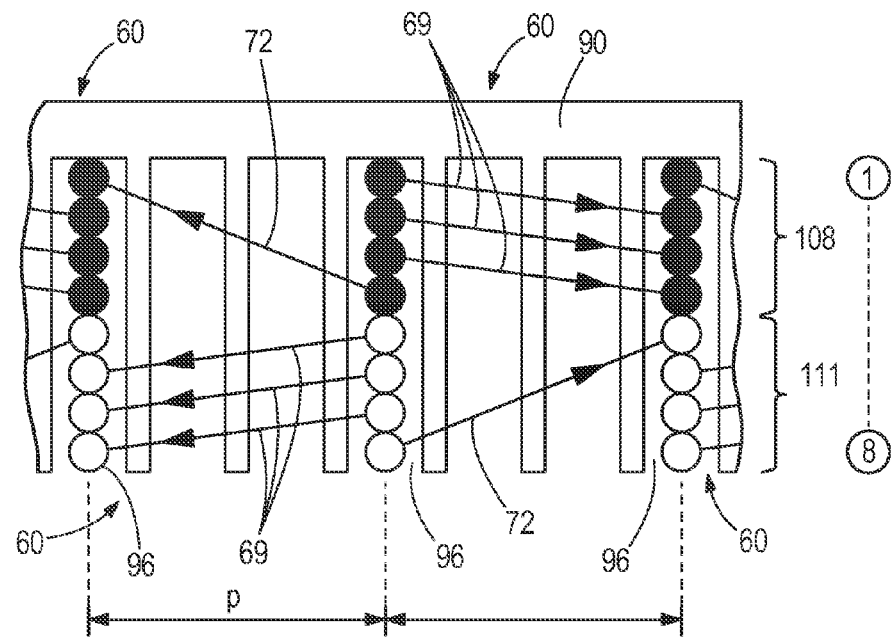
FIG. 12 and FIG. 13 show details of side views of the windings.

Depending on how many turns a coil 60 has, the following takes place:

FIG. 12 illustrates a winding 75 with in each case three turns per loop 60 (only one phase winding). Both the loops 60 of the part 111 and the part 108 have the same number of turns, with the result that the number of conductors in the end winding is the same at the position of any coil (with the exception of between the terminals). In this case, this is the loop side connectors 69 of a loop 60 and a loop connector 72. If a multiple wire or twin wire is used, the number is twice as high.

As can clearly be seen, the loop connectors (72) between two loops (60) have a multilayered configuration.

The end coils at the position of one loop (coil) comprise at least one loop turn convolution (number of turns=1) and a coil connector. The number of end coils per coil is identical on the D side ("D"rive side, pulley side) and B ("B"rush side). For an even number of conductors per slot, the number of end coils in the winding phase is constant. For an uneven number of conductors per slot, FIG. 13, the number of end coils is alternate from loop to loop in the winding phase. A coil has an even number of end coils on the D side and B side. The adjacent coil has end coils on the D and B side, the number of said end coils differing from the first mentioned coil by an end coil (see also FIG. 13). In this case, the part 111 has only two turns per loop, while the part 108 has three turns per loop.

The n (n=integral value) conductors of a winding phase part are directly one above the other in a slot. If a multiple wire comprising parallel wires is used as conductors, these wires can be arranged in the slot both next to one another and one above the other.

The n−1 conductors of a winding phase part become parallel end coils of a coil on the D and B sides. A conductor becomes a further end coil of this coil on the D and B sides. On the B or D side, this conductor becomes, as coil connector, an end coil of the adjacent coil. In the case of a winding phase with an even number of conductors in the slot and, for example, n=4 turn convolutions of a single wire for each loop of the two winding phase parts lying one above the other, the n=4 wires of one winding phase part occupy layers 1-4 of a slot. These four wires become in each case four parallel end coils of a coil on the D side. On the B side, the wires lead into three parallel end coils of the same coil and into an end coil comprising a coil connector, said end coil running parallel to the end coils of the adjacent coil. The B side is illustrated in FIGS. 12 and 13.

The end coils of this adjacent coil are formed from the n=4 wires of the second winding phase part. These four wires are arranged in layers 5-8 of the same slot and become in each case three parallel end coils on the B side. These three end coils are parallel to the end coil comprising a coil connector from layers 1-4. On the D side, the four wires of the second winding phase part become four parallel end coils of the same coil.

In the case of a winding phase with an uneven number of conductors and, for example, n1=4 (n1=even-numbered value) turn convolutions of a single wire for the loop of a winding phase part, the n1=4 wires of this one winding phase part occupy layers 1-4 of a slot. In a second winding phase part with n2=3 (n2=uneven-numbered value) turn convolutions of a single wire for the loops of a winding phase part lying over the first winding phase part, the n2=3 wires occupy layers 5-7 of the same slot.

Figure 13:
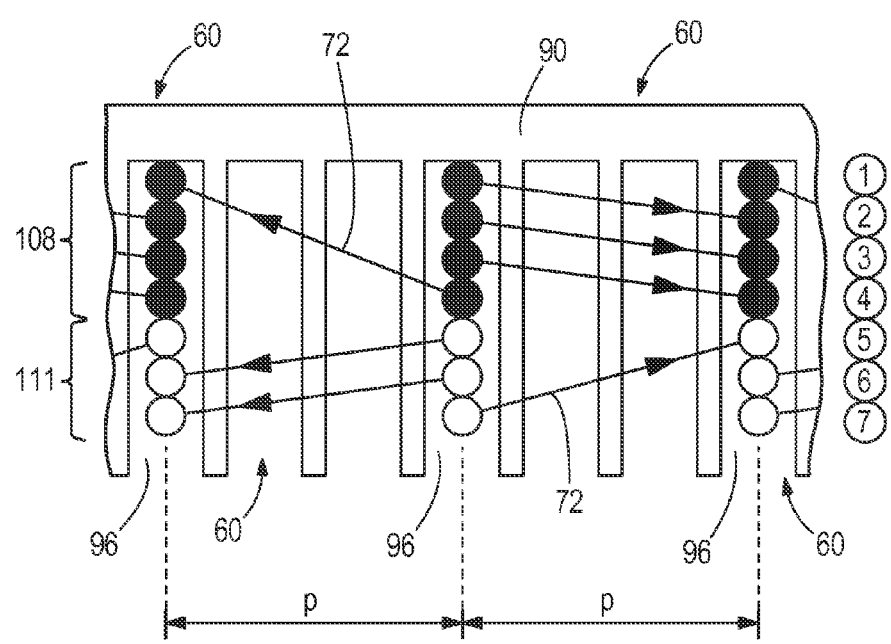

FIG. 13: the n1=4 wires of slot layers 1-4 become in each case four parallel end coils of a coil on the D side. On the B side, the wires lead to three parallel end coils of the same coil and an end coil comprising a coil connector, said end coil running parallel to the end coils of the adjacent coil.

The end coils of this adjacent coil are formed from the n2=3 wires of the second winding phase part. These three wires are arranged in layers 5-7 of the same slot and become in each case two parallel end coils on the B side. These two end coils are parallel to the end coil comprising a coil connector from layers 1-4. On the D side, the three wires of the second winding phase part become three parallel end coils of the same coil.

FIGS. 12 and 13 disclose a method in which, for a pole P, a sum of loop connectors 72 and loop side connectors 69 connecting two specific slots 96 is an even number (FIG. 12) or an uneven number (FIG. 13, left-hand side).

Furthermore, FIG. 13 discloses a method in which, for a pole P, a sum of loop connectors 72 and loop side connectors 69 connecting two specific slots 96 is an uneven number (left-hand side, 3) and, for a directly adjacent pole P of the phase winding, the sum is an even number (right-hand side, 4).

A lap winding phase comprises at least one winding wire. If the winding phase comprises more than one wire, the wires are parallel. The winding start and the winding end of the multiple wire correspond to one another. The single or multiple wire is wound in loops in one direction. The winding for a winding phase is continuous and uninterrupted.

A conductor comprises at least one wire. The wire can be in the form of either a single wire with only one wire or a multiple wire with at least two parallel wires.

The invention claimed is:

1. A method for producing a distributed lap winding for polyphase systems, the method comprising:
    forming a chain of non-concentric, side-by-side loops (60) with a linking direction (R) from a continuous segment of wire (81); and
    rotating at least one loop (60) with its loop sides (66) perpendicular to the linking direction (R) in such a way that at least one loop side (66) of the at least one loop (60) is folded over so as to be arranged next to at least one loop side (66) of another loop (60) in such a way that the at least one loop side (66) of the at least one loop (60) and the at least one loop side (66) of the another loop (60) are arranged at a position which corresponds to a slot position,
    wherein a winding-phase start (78) and a winding-phase end (84) of the wire (81) forming the chain of loops (60) are one pole width (P) apart from one another upon rotating the at least one loop (60).

2. The method as claimed in claim 1, further comprising arranging the at least one loop side (66) of the at least one loop (60) and the at least one loop side (66) of the another loop (60) directly adjacent to one another.

3. The method as claimed in claim 2, further comprising arranging the loop sides (66) in one or more rows.

4. The method as claimed in claim 1, further comprising rotating a part (108) of the winding (75) relative to another part (111) of the winding (75), to enclose an angle ($\alpha$) therebetween.

5. The method as claimed in claim 1, further comprising rotating a first part (108) of the winding (75) relative to a second part (111) of the winding (75) to enclose a first angle ($\alpha$) therebetween, and rotating a third part (114) of the winding (75) relative to the second part (111) of the winding (75) to enclose a second angle ($\beta$) therebetween.

6. The method as claimed in claim 5, wherein the first and second angles ($\alpha$; $\beta$) are on the same side of the second part (111).

7. The method as claimed in claim 5, wherein the first and second angles ($\alpha$; $\beta$) are on opposite sides of the second part (111).

8. The method as claimed in claim 1, further comprising providing a first pole (P) with a sum of loop connectors (72) and loop side connectors (69) connecting two specific slots (96) adding up to an odd number, and providing a second pole (P) directly adjacent the first pole (P) for which the sum of loop connectors (72) and loop side connectors (69) connecting two specific slots (96) adds up to an even number.

9. The method as claimed in claim 1, wherein the polyphase system is an AC generator.

* * * * *